US008253290B2

(12) United States Patent
Davis

(10) Patent No.: US 8,253,290 B2
(45) Date of Patent: Aug. 28, 2012

(54) ELECTRONIC RETROFIT CONTROLLER FOR HYDRAULICALLY ADJUSTED PRINTING PRESS

(75) Inventor: Dale R. Davis, Sheridan, OR (US)

(73) Assignee: Innovative Motor Controls, Inc., Casco, ME (US)

( * ) Notice: Subject to any disclaimer, the term of this patent is extended or adjusted under 35 U.S.C. 154(b) by 331 days.

(21) Appl. No.: 12/694,882

(22) Filed: Jan. 27, 2010

(65) Prior Publication Data

US 2010/0194216 A1 Aug. 5, 2010

Related U.S. Application Data

(60) Provisional application No. 61/147,820, filed on Jan. 28, 2009.

(51) Int. Cl.
*H02K 7/116* (2006.01)

(52) U.S. Cl. ....................................... 310/80; 310/49.01

(58) Field of Classification Search ............... 310/49.01, 310/80, 83, 112; 101/480, 486, 494; 318/14; 29/592.1; 74/89.23; *B41F 1/26; F16H 25/20; H02P 8/00; H02K 7/116, 37/00*
See application file for complete search history.

(56) References Cited

U.S. PATENT DOCUMENTS 2,922,633 A 1/1960 Gray
2,948,216 A 8/1960 Thompson
2,963,965 A 12/1960 Baumgartner
3,552,308 A 1/1971 Minehart
3,565,006 A 2/1971 Stewart
3,570,735 A 3/1971 Kurz
3,594,552 A 7/1971 Adamson et al.
3,601,046 A 8/1971 Motter
3,701,464 A 10/1972 Crum
3,717,092 A 2/1973 Crum
3,945,266 A 3/1976 Dufour et al.
4,177,730 A 12/1979 Schriber et al.
4,223,453 A 9/1980 Meyer
4,253,634 A 3/1981 Daniels
4,283,731 A 8/1981 Bok et al.
4,297,626 A 10/1981 Chiang
4,318,176 A 3/1982 Stratton et al.
4,528,630 A 7/1985 Sargent
4,549,923 A * 10/1985 Tachibana et al. ............ 156/423
4,603,336 A 7/1986 Dufour et al.
4,676,155 A 6/1987 Harry et al.
4,811,939 A 3/1989 Keith
4,841,855 A 6/1989 Marcum
4,852,486 A 8/1989 Ely et al.

(Continued)

OTHER PUBLICATIONS

Supplementary European Search Report, EP 07 71 7062, date of mailing Feb. 12, 2009.

(Continued)

*Primary Examiner* — Quyen Leung
*Assistant Examiner* — Naishadh Desai
(74) *Attorney, Agent, or Firm* — Hamilton, Brook, Smith & Reynolds, P.C.

(57) ABSTRACT

A retrofit kit for a printing press adjustment hydraulic actuator. The hydraulic actuator is maintained to benefit from its mounting position and alignment, but the hydraulic fluid is removed. A hydraulic actuator shaft is attached to a mechanism that converts the rotary motion of an electric motor to linear motion. The electric motor provides faster and more accurate control of the hydraulic actuator shaft than the hydraulic fluid, providing for faster adjustment of the printing press.

11 Claims, 7 Drawing Sheets

U.S. PATENT DOCUMENTS

| | | | | |
|---|---|---|---|---|
| 4,945,828 | A | 8/1990 | Gabriel et al. | |
| 5,001,950 | A | 3/1991 | Fokos et al. | |
| 5,076,164 | A | 12/1991 | Becker | |
| 5,570,633 | A | 11/1996 | Schultz et al. | |
| 5,819,660 | A * | 10/1998 | Gegenheimer et al. | 101/425 |
| 5,893,557 | A | 4/1999 | Beduhn et al. | |
| 6,173,799 | B1 | 1/2001 | Miyazaki et al. | |
| 6,222,362 | B1 | 4/2001 | Schulter et al. | |
| 6,418,827 | B1 | 7/2002 | Bussey et al. | |
| 6,470,225 | B1 | 10/2002 | Yutkowitz | |
| 6,557,245 | B2 * | 5/2003 | Beduhn et al. | 29/724 |
| 6,588,107 | B2 * | 7/2003 | Beduhn | 29/898.09 |
| 6,691,491 | B2 * | 2/2004 | Terminella et al. | 53/133.4 |
| 6,901,658 | B2 | 6/2005 | Ohashi et al. | |
| 6,961,628 | B2 | 11/2005 | Yutkowitz | |
| 7,931,362 | B2 * | 4/2011 | Burke | 347/103 |
| 2003/0106445 | A1 | 6/2003 | Weis | |
| 2005/0269887 | A1 * | 12/2005 | Blanding et al. | 310/112 |
| 2006/0113933 | A1 * | 6/2006 | Blanding et al. | 318/116 |

OTHER PUBLICATIONS

PCT International Search Report, PCT/US07/02218, date of mailing Nov. 2, 2007.

* cited by examiner

1. THE NEW SYSTEM WILL OPERATE IN 2 DIFFERENT MODES:
   - A. THE 3RD PARTY SYSTEM WILL CONTINUE TO CONTROL REGISTRATION IN AUTOMATIC MODE. THE NEW IMC SYSTEM IS TO OPERATE AS AN ISOLATED INDEPENDANT BACKUP SYSTEM.
   - B. ON OCCASIONS WHEN THE 3RD PARTY SYSTEM IS DISABLED, IMC BACK UP SYSTEM WILL REPLACE THE 3RD PARTY SYSTEM. IN THIS CASE THE CONTROL CHANGES FROM AN AUTOMATIC SYSTEM TO A MANUAL SYSTEM.
   - C. IMC PLC WILL MONITOR ALARM OUTPUTS FROM THE MOTOR DRIVER.
   - D. IMC PLC WILL BE ABLE TO SEND OUTPUTS TO MOTOR DRIVER TO CLEAR ALARMS.
   - E. IMC PLC WILL MONITOR MOTOR POSITION VIA MOTOR DRIVER OUTPUTS.
   - F. IMC PLC WILL HAVE PROGRAMMED MOTOR LIMITS TO STOP MOTOR FROM EXCEEDING LIMITS.
   - G. THE IMC PLC MANUAL CONTROL IS DONE VIA A TOUCH SCREEN DEVICE INSTALLED ON EACH TOWER.
   - H. EACH TOWER CONTAINS 4 PRINTING UNITS, AND EACH PRINTING UNIT CONTROLS 4 AXIS, WITH A TOTAL OF 16 AXIS (MOTORS) CONTROLLED VIA A TOUCH SCREEN ON EACH TOWER.

2. THE SYSTEM MUST INCORPORATE A METHOD TO ENSURE BOTH SYSTEMS CANNOT BE ENABLED SIMULTANEOUSLY.

FIG. 3

ELECTRONIC RETROFIT CONTROLLER FOR HYDRAULICALLY ADJUSTED PRINTING PRESS

RELATED APPLICATIONS

The present application claims the benefit of a prior U.S. Provisional Application No. 61/147,820, filed Jan. 28, 2009. The entire teachings of the above application are incorporated herein by reference.

BACKGROUND OF THE INVENTION

Some printing presses, such as the Goss "Metro Color" printing press, use hydraulic actuators to adjust the circumferential and lateral registers of each color print roller on the press. The hydraulic systems cause two problems: inaccurate adjustments and slow adjustment times. The inaccuracies are caused by continued movement of the hydraulic actuator after a control input has ceased. Also, the hydraulic controls are limited to a relatively large minimum adjustment such that an operator often has to overshoot an adjustment in one direction to "dial in" the adjustment in the opposite direction. The slow adjustment times are caused by incapability of the hydraulic supply system to simultaneously actuate several different actuators.

Because the printing press is printing paper during the adjustment period after start-up, the printing press is generating waste until the printer is calibrated. Delays in calibration caused by the inaccuracies and slow adjustment times described above are significant contributors to the amount of generated waste. Also, printing presses tend to require periodic adjustments to the register during a print run. Again, the delays in calibration result in significant waste.

SUMMARY OF THE INVENTION

An example embodiment of the present invention include a motor and assembly that attaches to existing hydraulic actuators and replaces the hydraulic power operating the actuator with electrical power. The electrically-powered actuators can be operated simultaneously with each other, enabling faster calibration than hydraulically powered actuators, which must be operated individually. Also, the electrically-powered actuators are more accurate than the hydraulic-powered actuators because they can take smaller steps than the hydraulic-powered actuators and because they do not overshoot, i.e., tend to continue actuating after the control signal ends. These benefits of electrically-powered actuators significantly reduce the time required to calibrate the register of a color printing press, thereby increasing the time available to run a printing job and decreasing the amount of waste generated.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 3 is a flow chart of integration of a dedicated control system with a third party system;

DETAILED DESCRIPTION OF THE INVENTION

A description of example embodiments of the invention follows.

Figure 1:
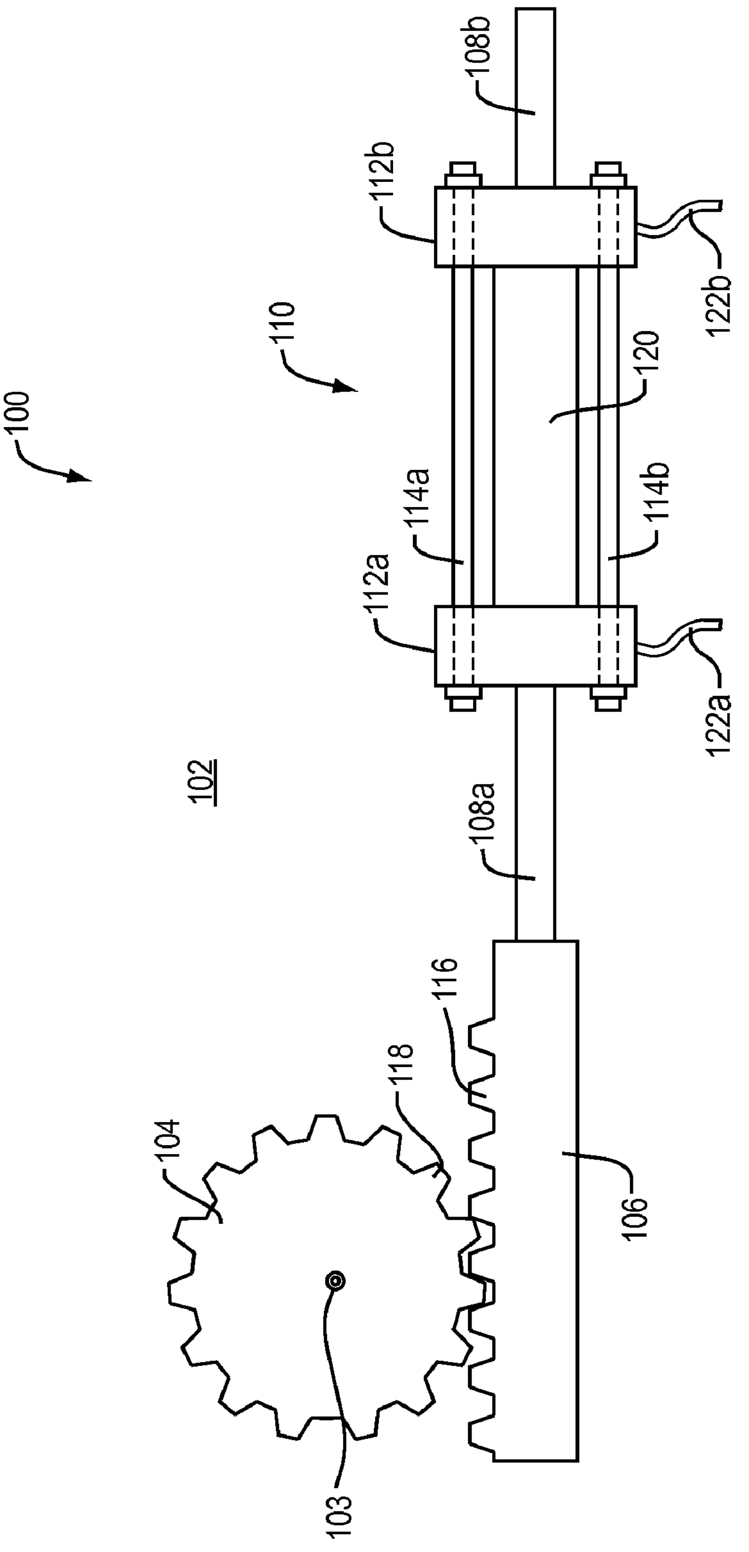
FIG. 1 is a side view of a printing press adjustment gear and its hydraulic actuator.

FIG. 1 shows a prior art hydraulically actuated printing press adjustment 100. A gear 104 is mounted to a frame member 102 of a printing press and the axis of rotation 103 of the gear 104 is connected to an adjustment mechanism (not shown) of the printing press. For example, gear 104 may be connected to a mechanism that adjusts one of lateral or circumferential position of a printing press cylinder (not shown). The gear has teeth 118 (partially shown), which mesh with corresponding gears 116 on a rack 106. An end of the rack 106 is attached to a hydraulic actuator shaft 108*a*. The hydraulic actuator shaft 108*a* passes through a housing 110 and an opposite end of the hydraulic actuator shaft 108*b* extends from the opposite end of the housing 110. The housing includes a cylinder wall 120 and two end caps 112*a*, 112*b*. The end caps 112*a*, 112*b* are pressed against the ends of cylinder wall 120 by threaded rods 114*a*, 114*b*. Note that FIG. 1 only shows two threaded rods 114*a*, 114*b*. Typically, the end caps 112*a*, 112*b* are pressed against the ends of cylinder wall 120 by four threaded, but only two of the four threaded 114*a*, 114*b* are visible in FIG. 1. Hydraulic lines 122*a* and 122*b* feed hydraulic fluid under pressure into respective ends of the hydraulic cylinder 120 via the end caps 112*a*, 112*b* to push the hydraulic actuator shaft 108*a*, 108*b* in a direction towards or away from the gear 104. For example, adding hydraulic fluid at hydraulic line 122*b* into end cap 112*b* pushes the hydraulic actuator shaft 108*a*, 108*b* towards the gear 104. Conversely, adding hydraulic fluid at hydraulic line 122*a* into end cap 112*a* pushes the hydraulic actuator shaft 108*a*, 108*b* away from the gear 104. Thus, by controlling the flow of hydraulic fluid, an operator can cause the hydraulic actuator shaft 108*a*, 108*b* to turn the gear 104 via the rack 106.

As discussed above, there are several disadvantages of a hydraulic system. First, the hydraulic system is relatively inaccurate. Second, due to constraints on the hydraulic pressure supply, only one or a small number of hydraulic actuators can be operated at one time.

Figure 2A:
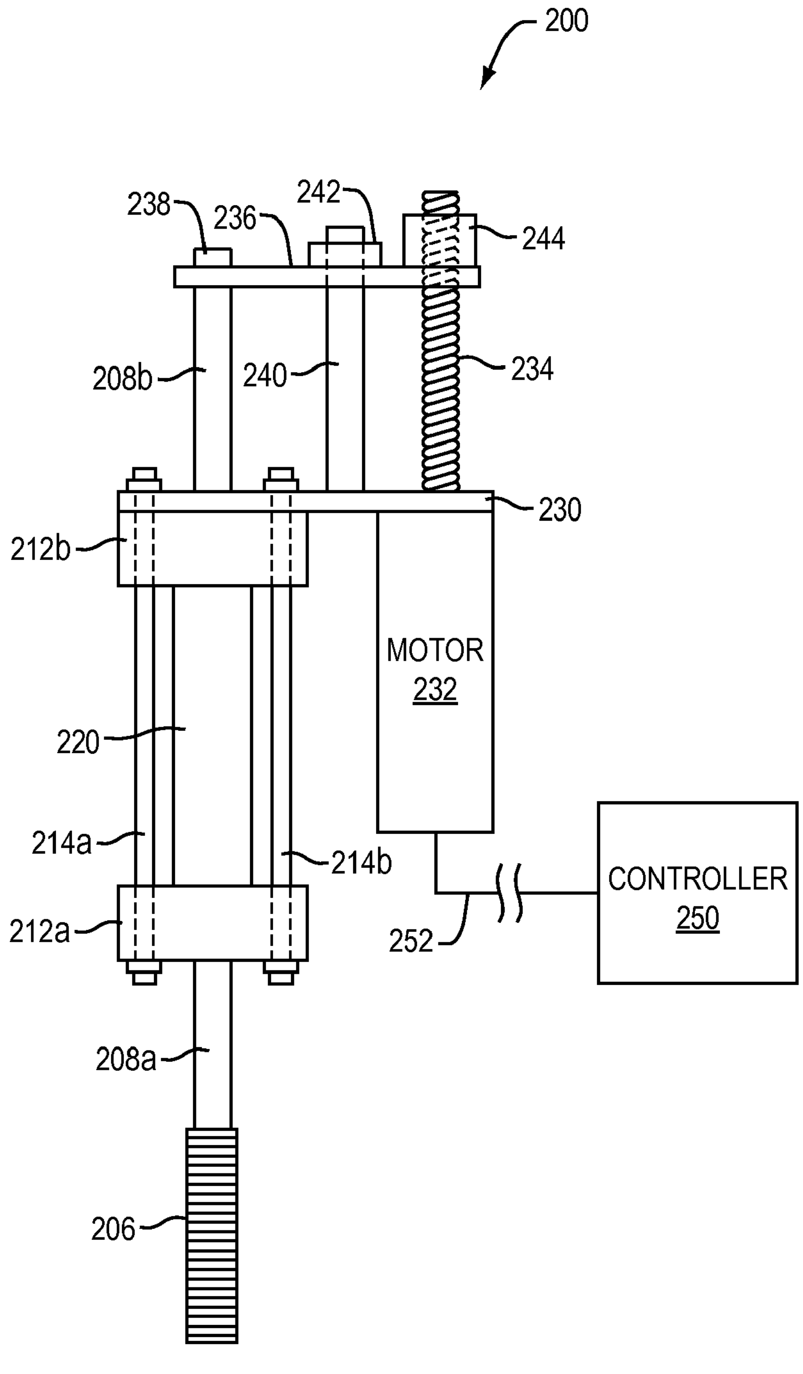
FIG. 2A is a bottom view of a hydraulic actuator retrofit to be driven by an electric stepper motor according to an embodiment of the invention.
Figure 2B:
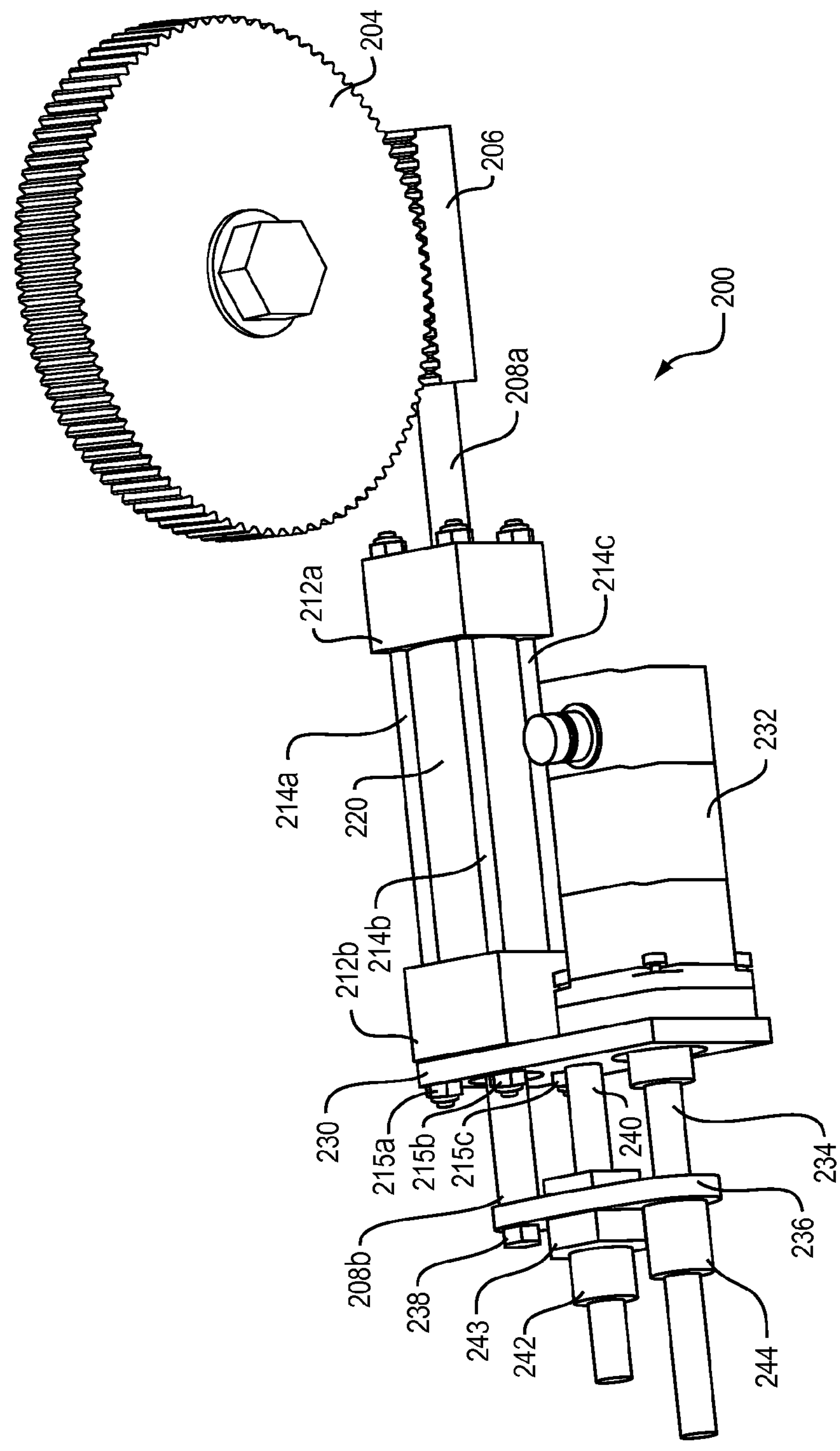
FIG. 2B is a perspective view of the hydraulic actuator retrofit of FIG. 2A.
Figure 2C:
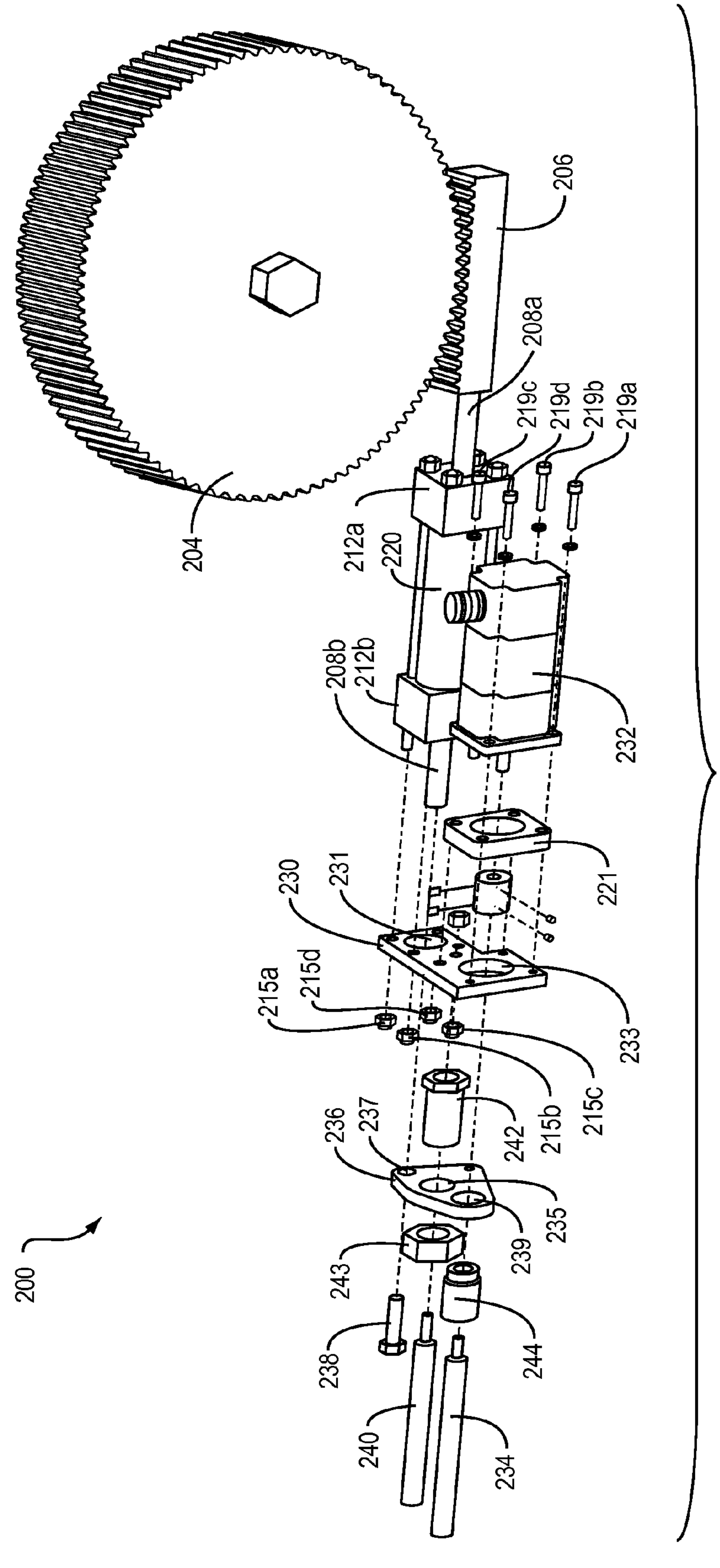
FIG. 2C is an exploded view of the hydraulic actuator retrofit of FIGS. 2A and 2B.

FIGS. 2A-2C show an example embodiment of a retrofit kit 200 according to the present invention that replaces hydraulic fluid with an electric motor 232 to actuate the hydraulic actuator shaft 208*a*, 208*b*. The hydraulic cylinder 220, end caps, and hydraulic actuator shaft 208*a*, 208*b* are left in place mounted to a frame member of the printing press (not shown). Hydraulic lines (not shown in FIGS. 2A-2C, but see 122*a-b* in FIG. 1) are disconnected from the end caps 212*a*, 212*b* and hydraulic fluid (not shown) inside the hydraulic cylinder 220 is drained. With the hydraulic cylinder 220 drained of hydraulic fluid (not shown), the hydraulic actuator shaft 208*a*, 208*b* can move freely. Nuts 215*a-d* are temporarily removed from threaded rods 214*a-c* (a fourth threaded rod is not visible in FIGS. 2A-2C), and stationary bracket 230 is mounted next to end cap 212*b*. The nuts 215*a-d* are reassembled onto threaded rods 214*a-c* (and the fourth rod, which is not visible in FIGS. 2A-2C) to also hold bracket against end cap 212*b*. Threaded rods 214*a-c* (and the fourth threaded rod not visible in FIGS. 2A-2C) may be replaced with longer threaded rods to accommodate the thickness of the stationary bracket 230. Hydraulic actuator shaft 208*b* passes through a hole 231 in the stationary bracket 230.

The stationary bracket 230 extends past a side of end cap 212*b* and electric motor 232 mounts to the stationary bracket 230 at the extension. The motor 232 may be mounted to stationary bracket 230 by bolts 219*a-d*, rivets (not shown), or any other commonly-used fastening mechanism. Optionally, a space plate 221 may be included between the motor 232 and the stationary bracket 230. Typically, the electric motor 232 is a two-phase stepper motor having at least 200 steps per revolution (1.8 degree increments). A two-phase electric stepper motor having 400 steps per revolution may also be used to achieve even higher degrees of accuracy. If a stepper motor having 400 steps per revolution is used, software in a controller 250 can provide for larger step increments, such as 200 steps per revolution when larger adjustments to the printing press are required.

An output shaft 234 of the motor 232 extends through a hole 233 in the stationary bracket. In the embodiment shown in FIGS. 2A-2C, the output shaft 234 is threaded. The threaded output shaft 234 may be a separate piece connected to the output shaft of the electric motor 232. When the end cap 212*b* and electric motor 232 are both attached to the bracket 230, the threaded output shaft 234 and hydraulic actuator shaft 208*b* are parallel to each other. A movable bracket 236 is attached to the hydraulic actuator shaft 208*b* and electric motor output shaft 234. The movable bracket 236 is attached to the end of hydraulic actuator shaft 208*b* with a bolt 238 that passes through hole 237 in the bracket 236 and threads into a threaded hole (not shown) in the end of the hydraulic actuator shaft 208*b*. The hole (not shown) in the hydraulic actuator shaft 208*b* may need to drilled and tapped. The threaded output shaft 234 is threaded through a threaded hole 239 in the movable bracket 236.

With the movable bracket 236 attached to the end of the hydraulic actuator shaft 208*b* and threaded onto the threaded output shaft 234 of the electric motor 232, rotation of the threaded output shaft 234 causes the movable bracket 236 to move towards or away from the electric motor 232 and hydraulic cylinder 220. The movement of the movable bracket 236 causes the hydraulic actuator shaft 208*a*, 208*b* to also move with respect to the hydraulic cylinder 220. The rack 206 attached to the end of hydraulic actuator shaft 208*a* moves beneath the printing press adjustment gear 204.

FIGS. 2A-2C also show a guide shaft 240 attached to the stationary bracket 230 and passing through a hole 235 in the movable bracket 236. The movable bracket 236 slides over the guide shaft 240, the guide shaft 240 keeping the movable bracket 236 perpendicular to the axes of the hydraulic actuator shaft 208*b* and the electric motor 232 output shaft 234, thereby preventing the movable bracket 236 from binding on the threaded shaft. A bushing 242 may be fitting inside the hole 235 in the movable bracket 236 such that the guide shaft 240 is in sliding contact with the bushing 242 rather than the hole 235 in the movable bracket 236. The bushing 242 may improve the effectiveness of the guide shaft 240 to prevent binding between the movable bracket 236 and the threaded output shaft 234. The bushing 242 may be installed and fixed in place with nut 243.

FIG. 2A also shows a controller 250 attached to the electric motor 232 via wires or cables 252. The controller 250 may be a programmable logic controller (PLC) and is configured to send electrical signals to the electric motor 232, causing the motor 232 to turn the threaded output shaft 234 in either a clockwise or counterclockwise direction. The controller for the removed hydraulic system may be repurposed to control the electric motor 232. Alternatively, a new controller 250 may be installed with the above-described assemblies. The controller may be configured to accept commands from a human operator, e.g., the human operator may push a first button that causes the motor to turn clockwise or push a second button that causes the motor to turn counterclockwise. The controller may also be automated and computer controlled, responding to sensor readings to determine when an adjustment needs to be made and automatically making the required adjustment. The sensor is typically a camera pointed at a color register on each print page that indicates alignment of the print rollers for the different colors with respect to each other. When the camera detects a misalignment of a print roller, a computer coupled to the camera and receiving the misalignment information instructs the controller 250 to turn the motor 232 to adjust the print roller.

The controller also may control other types of actuators, e.g., a motor coupled to a hand adjustment wheel as described in U.S. Pat. Nos. 7,208,904 and 7,408,316, both titled "Multiple Motor Position Control," U.S. Pat. No. 7,321,212, titled "Restricted Motion Motor Control with Visual Indication," U.S. application Ser. No. 11/344,867, titled "Quick Disconnect Motor Mount," and U.S. application Ser. No. 11/344,866, titled "Flexible Cantilever Motor Mount," all of which are incorporated herein by reference.

A typical printing press has a total of eight printing rollers, one roller for each of the four colors printed on each side of a piece of paper. Each roller has two adjustments: circumferential adjustment, i.e., clocking the print roller with respect to the other print rollers, and lateral adjustment, i.e., moving the print roller with respect to the other print rollers. Thus, there are a total of sixteen gears, such as gear 104 on a printing press, and a total of sixteen retrofit kits, such as retrofit kit 200 in FIG. 2, may be used to upgrade a printing press. The electric motor 232 of each retrofit kit 200 may be controlled by a dedicated controller 250 or all sixteen motors 232 of the sixteen retrofit kits 200 may be controlled by a single controller 250.

Figure 4:
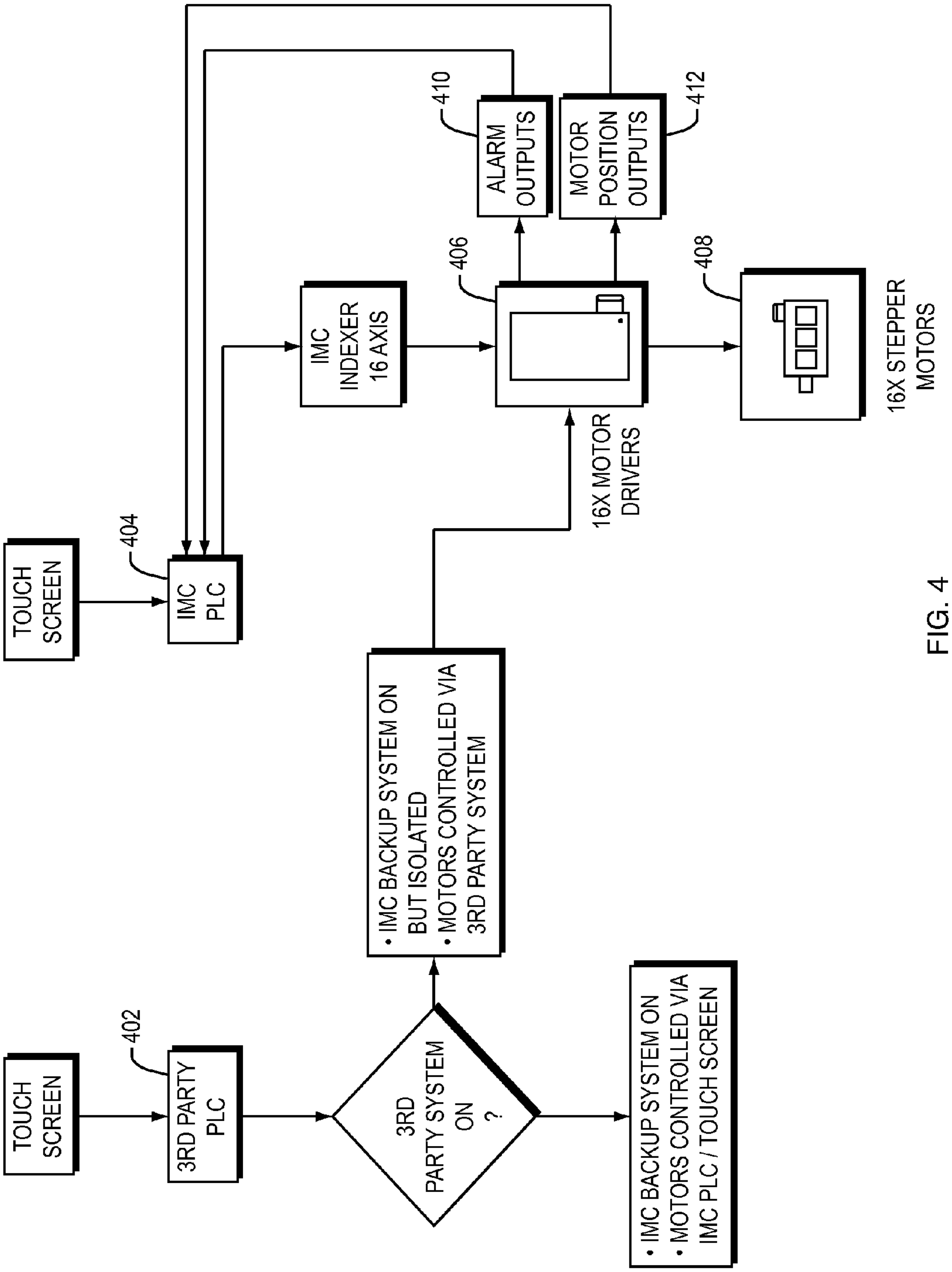
FIG. 4 is a flow chart showing operation of dedicated programmable logic controller and third party programmable logic controller.
Figure 5:
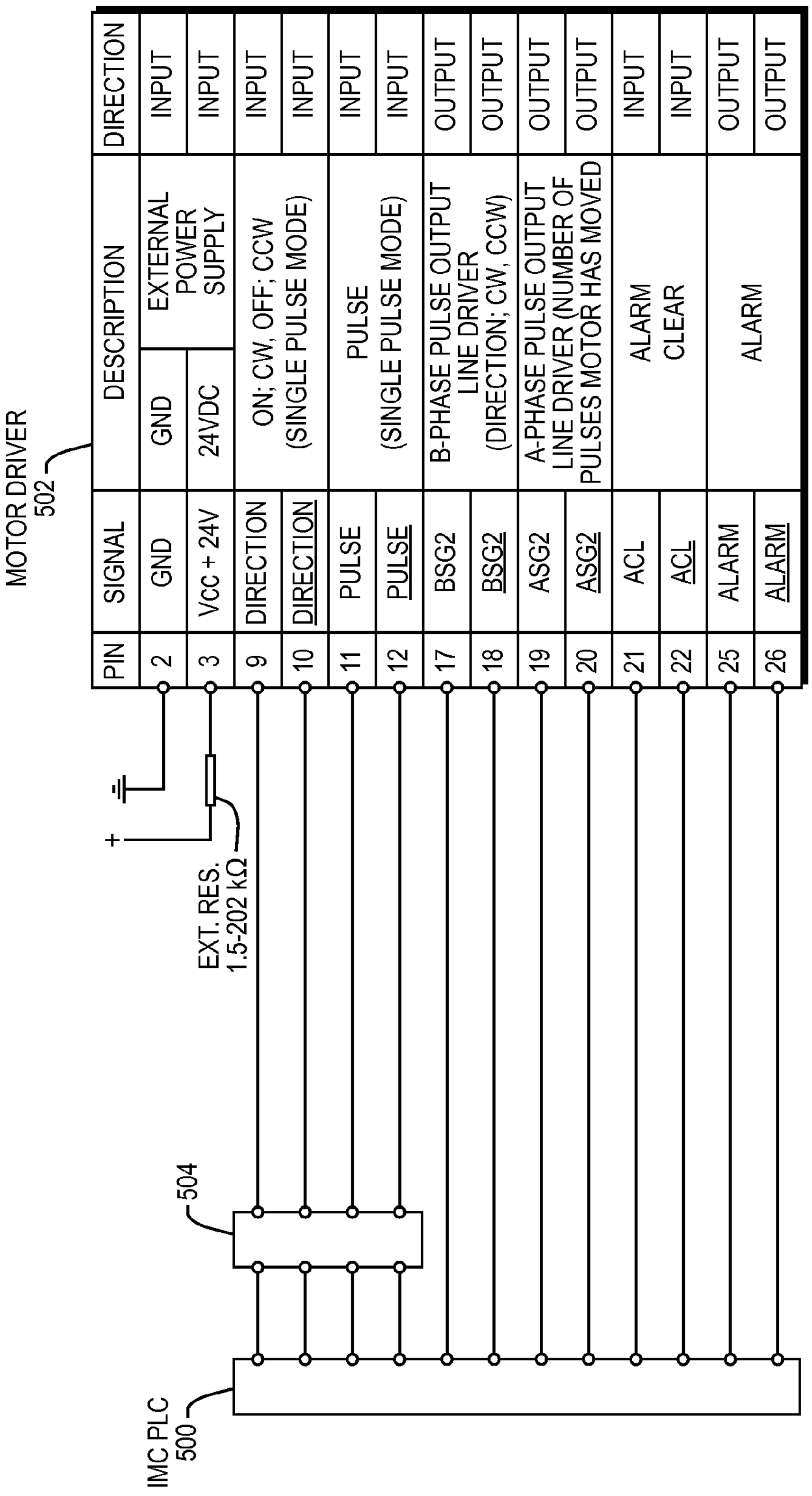
FIG. 5 is a schematic wiring diagram for a dedicated programmable logic controller.

FIGS. 3-5 show how a dedicated programmable logic controller (PLC) may be incorporated into a third party system already operating on a printing press. As described in step 1*a*. of FIG. 3, the third party PLC maintains control of color registration adjustments unless it is disabled (by failure or by being taken off line on purpose). If the third party system is disabled, the dedicated PLC automatically takes control of the color registration adjustments (as described in Steps 1*b*. to 1*h*.). Embodiments of such a dual PLC systems include a safeguard to ensure that both the dedicated PLC and third party PLC are not simultaneously enabled.

FIG. 4 shows a schematic diagram of a third party PLC 402 and a dedicated PLC (labeled "IMC PLC") 404 simultaneously connected to a motor driver 406. If the third party PLC 402 is in control, then the dedicated PLC 404 does not control the stepper motors 408. However, the dedicated PLC 404 does monitor the positions of stepper motors 412 and any system alarms 410.

FIG. 5 shows a schematic diagram how a dedicated PLC 500 may be connected to a motor driver 502. Signals representing direction of motor driving (Pins 17 and 18), signals representing number of motor driving pulses (Pins 19 and 20), and signals representing alarms (Pins 25 and 26) are always provided to the dedicated PLC 500. Also, the dedicated PLC 500 can clear alarms via Pins 21 and 22 if the $3^{rd}$ party PLC 9 not shown in FIG. 5) is not capable of controlling electric motors. FIG. 5 also shows a relay switch 504 that connects either the dedicated PLC 500 or the third party PLC (not shown) to the motor driver 502 (Pins 9 and 10 for motor direction and Pins 11 and 12 for motor activation). Normally, the relay switch 502 closes an electrical circuit with the third party PLC (not shown) such that the dedicated PLC 500 cannot send control signals to the motor driver 502. In the event the third party PLC (not shown) is disabled, the relay switch 504 closes the circuit to the dedicated PLC 500 so the dedicated PLC 500 may send control signals to the motor driver 502.

While this invention has been particularly shown and described with references to example embodiments thereof, it will be understood by those skilled in the art that various changes in form and details may be made therein without departing from the scope of the invention encompassed by the appended claims.

What is claimed is:

1. An electric-motor controlled actuator for a printing press, comprising:

an electric motor;

a first bracket configured to rigidly mount the electric motor in fixed association with a hydraulic actuator drained of hydraulic fluid, the electric motor having a threaded output shaft parallel to an actuator shaft of the hydraulic actuator;

a second bracket configured to couple to an end of the actuator shaft of the hydraulic actuator and also configured to couple to the threaded shaft such that the second bracket moves the end of the actuator shaft when the electric motor turns its threaded shaft.

2. The electric-motor controlled actuator of claim 1 wherein the electric motor is a stepper motor.

3. The electric-motor controlled actuator of claim 1 further comprising a guidance shaft coupled to the first bracket and configured to guide the movement of the second bracket in a direction of orientation of the actuator shaft.

4. The electric-motor controlled actuator of claim 1 further comprising a controller unit electrically coupled to the electric motor and configured to power the electric-motor.

5. The electric-motor controlled actuator of claim 4 wherein the controller is automatically controlled by a computer.

6. A method for retrofitting an electrical motor to power a hydraulic actuator mounted to a printing press, comprising:

removing hydraulic fluid from a hydraulic actuator;

rigidly coupling a first bracket to an end of the hydraulic actuator, an end of a hydraulic actuator shaft passing through the bracket;

rigidly coupling an electric motor to the first bracket, a threaded output shaft of the electric motor passing through the bracket, the threaded output shaft of the electric motor oriented parallel to the hydraulic actuator shaft;

coupling a second bracket to the end of the actuator shaft and threading the second bracket onto an end of the threaded shaft; and operating the actuator shaft by turning the electric motor, which turns the threaded shaft, which moves the second bracket to move the actuator shaft.

7. The method of claim 6 wherein rigidly coupling an electric motor to the first bracket comprises rigidly coupling an electric stepper motor to the first bracket.

8. The method of claim 6 further comprising rigidly coupling a guidance shaft to the first bracket;

passing the guidance shaft through the second bracket; and guiding the movement of the second bracket with the guidance shaft.

9. The method of claim 6 wherein turning the electric motor comprises sending a control signal to the electric motor.

10. The method of claim 9 wherein sending a control signal to the electric motor comprises sending a control signal from a computer controller.

11. The method of claim 10 wherein the computer controller is automated.

* * * * *